United States Patent
White et al.

(10) Patent No.: US 10,193,486 B1
(45) Date of Patent: Jan. 29, 2019

(54) PARALLELED MULTIPHASE INVERTER CONTROL FOR ELECTRIC MACHINE

(71) Applicants: Paul M. White, Sunnyvale, CA (US); Hugh J. Jay, Mountain View, CA (US)

(72) Inventors: Paul M. White, Sunnyvale, CA (US); Hugh J. Jay, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/648,856

(22) Filed: Jul. 13, 2017

Related U.S. Application Data

(60) Provisional application No. 62/396,949, filed on Sep. 20, 2016.

(51) Int. Cl.
 *H02P 27/04* (2016.01)
 *H02P 25/22* (2006.01)
 *H02P 27/08* (2006.01)

(52) U.S. Cl.
 CPC .............. *H02P 25/22* (2013.01); *H02P 27/08* (2013.01)

(58) Field of Classification Search
 CPC ... G05B 11/28; G05F 1/10; H02P 1/00; H02P 1/46; H02P 3/18; H02P 6/00; H02P 6/14; H02P 27/04; H02P 27/06; H02P 21/00; H02P 23/00; H02P 27/00
 USPC ..... 318/599, 400.01, 400.02, 700, 701, 705, 318/727, 799, 800, 801, 430, 432, 811; 363/21.1, 40, 44, 95, 120, 174, 175
 See application file for complete search history.

(56) References Cited

U.S. PATENT DOCUMENTS

| | | | |
|---|---|---|---|
| 4,761,599 A | 8/1988 | Yasunobu et al. | |
| 4,777,578 A | 10/1988 | Jahns | |
| 5,291,106 A | 3/1994 | Murty et al. | |
| 5,341,075 A | 8/1994 | Cocconi | |
| 5,414,339 A * | 5/1995 | Masaki | B60L 3/003 318/139 |
| 5,519,275 A | 5/1996 | Scott et al. | |
| 5,705,909 A | 1/1998 | Rajashekara | |
| 5,982,136 A | 11/1999 | Pelly | |
| 6,490,752 B2 | 12/2002 | Kushida et al. | |
| 7,439,697 B2 * | 10/2008 | Miyazaki | B60L 11/123 310/112 |
| 7,800,331 B2 * | 9/2010 | Chakrabarti | H02P 27/08 318/105 |
| 8,415,904 B2 | 4/2013 | Rippel | |
| 8,421,388 B2 * | 4/2013 | Mukai | B62D 5/0463 318/400.01 |
| 8,780,594 B2 * | 7/2014 | Chi | H02P 27/08 318/400.26 |
| 8,872,461 B2 * | 10/2014 | Kaneko | H02P 1/022 318/478 |
| 8,928,293 B1 | 1/2015 | Rozman et al. | |
| 9,263,948 B1 * | 2/2016 | Vovos | H02M 3/158 |
| 9,306,488 B2 * | 4/2016 | Soh | H02P 27/08 |
| 9,762,171 B2 * | 9/2017 | Tateda | B60L 3/0061 |
| 9,800,187 B2 * | 10/2017 | Lee | H02P 23/00 |
| 2016/0200355 A1 * | 7/2016 | Mori | B62D 5/0484 180/446 |

(Continued)

FOREIGN PATENT DOCUMENTS

JP 5923215 B2 5/2016

*Primary Examiner* — Antony M Paul
(74) *Attorney, Agent, or Firm* — Young Basile Hanlon & MacFarlane, P.C.

(57) ABSTRACT

A first and second inverter have paired outputs that each correspond to a phase and are controlled to supply multiphase power.

20 Claims, 9 Drawing Sheets

(56) References Cited

U.S. PATENT DOCUMENTS

2016/0325777 A1* 11/2016 Mori ...................... H02P 25/22

* cited by examiner

PARALLELED MULTIPHASE INVERTER CONTROL FOR ELECTRIC MACHINE

CROSS-REFERENCE TO RELATED APPLICATIONS

This application claims the benefit of U.S. Provisional Application No. 62/396,949, entitled "Paralleled Multiphase Inverter Control for Electric Machine," filed on Sep. 20, 2016, the content of which is incorporated herein by reference in its entirety.

TECHNICAL FIELD

The present disclosure relates to multiphase inverter control of electric machines.

BACKGROUND

An electric machine, also known as an electric motor, may be designed to operate using a multiphase alternating current (AC) power supply, such as a three-phase alternating current power supply. In a system that utilizes a direct current (DC) power supply, such as a battery, an inverter may be used to convert the DC power to AC power in order to operate the electric machine. The inverter may include switches or groups of switches that each correspond to a different phase of the AC power. The inverter may be controlled by pulse width modulation (PWM) signals that turn each of the switches or groups of switches on and off.

SUMMARY

One aspect of the disclosed embodiments is a method that includes controlling a first inverter and a second inverter, the first inverter having a first plurality of switch pairs and the second inverter having a second plurality of switch pairs, wherein the first plurality of switch pairs and the second plurality of switch pairs are operated in a pulse width modulation sequence to produce a plurality of outputs. The method also includes pairing (but not electrically connecting) the output of each switch pair of the first inverter with output of a respective switch pair of the second inverter to produce a plurality of paired outputs that are each associated with one phase to supply multiphase power. The method also includes measuring current for each paired output using a single current sensor at each paired output.

Another aspect of the disclosed embodiments is a method that includes controlling a first inverter and a second inverter according to a pulse width modulation sequence to produce a plurality of outputs, the first inverter having a first plurality of switch pairs and the second inverter having a second plurality of switch pairs. The method also includes pairing the plurality of outputs such that a plurality of paired outputs each include a first output corresponding to the first plurality of switch pairs and a second output corresponding to the second plurality of switch pairs, wherein each paired output is associated with one phase to supply multiphase power and the pulse width modulation sequence causes output currents at a pulse width modulation frequency for a group of switch pairs corresponding to the plurality of paired outputs to be out of phase by about 180 degrees with respect to one another, but with equal duty cycle. The method also includes supplying the multiphase power to a multiphase motor load, wherein each phase of the multiphase motor load is coupled to a respective paired output from the plurality of paired outputs.

Another aspect of the disclosed embodiments is an apparatus that includes a first inverter comprising a first plurality of switch pairs coupled to a DC input voltage, and a second inverter comprising a second plurality of switch pairs coupled to the DC input voltage. A first paired output includes a first switch output of the first plurality of switch pairs and a first switch output of the second plurality of switch pairs. A second paired output includes a second switch output of the first plurality of switch pairs and a second switch output of the second plurality of switch pairs. A third paired output includes a third switch output of the first plurality of switch pairs and a third switch output of the second plurality of switch pairs. The apparatus also includes a pulse width modulation controller for controlling the first plurality of switch pairs and the second plurality of switch pairs by pulse width modulation to generate a three-phase current supply from the first paired output, the second paired output and the third paired output. The pulse width modulation controller causes generation of the three-phase power supply such that output currents for the switch pairs corresponding to the first paired output are out of phase by about 180 degrees with respect to one another with equal duty cycle.

DETAILED DESCRIPTION

An electric machine, which may be referred to herein as an electric motor, may be driven by a power source and an inverter that converts DC voltage from the power source into a three-phase power feed under pulse width modulation control. The electric motor may include a rotor, a rotor shaft, a stator, windings, and a bearing that supports the rotor. The electric motor may have one winding per phase, with the windings being disposed in slots that are formed in a stator.

Pulse width modulation control of the inverter may cause high voltage electrical power to be applied to the rotor when the switches for all phases are simultaneously turned on, referred to as a zero state in the PWM scheme. In particular, there may be capacitive coupling between the stator and the rotor during switching of the inverter power feeds. The capacitive coupling between the stator and the rotor may result in an accumulation of voltage differential between the rotor shaft of the electric machine and the frame of the electric machine. Once the accumulated voltage becomes sufficiently large, a current discharge from the rotor shaft to the frame of the electric machine may occur across a bearing that supports the rotor for rotation with respect to the frame. Repeated current discharges may damage the bearing and the bearing races that support the bearing.

The disclosure describes control of multiphase inverters, which may supply power to a multiphase motor. Each phase may be driven by a pair of inverter outputs, such as by coupling a switch pair output of the first inverter and a second switch pair output of the second inverter. A pulse width modulation controller may control the switching operation for the inverters such that for each phase, the PWM (pulse width modulation) frequency output of the first inverter is out of phase with the output of the second inverter by about 180 degrees. By such maintaining such a phase shift between the inverters, the switching state with all upper switches of the first inverter turned on (and all lower switches turned off) corresponds to all lower switches of the second inverter being turned on (and all upper switches being turned off), which produces a zero voltage output and reduces the potential for arcing.

Figure 1:
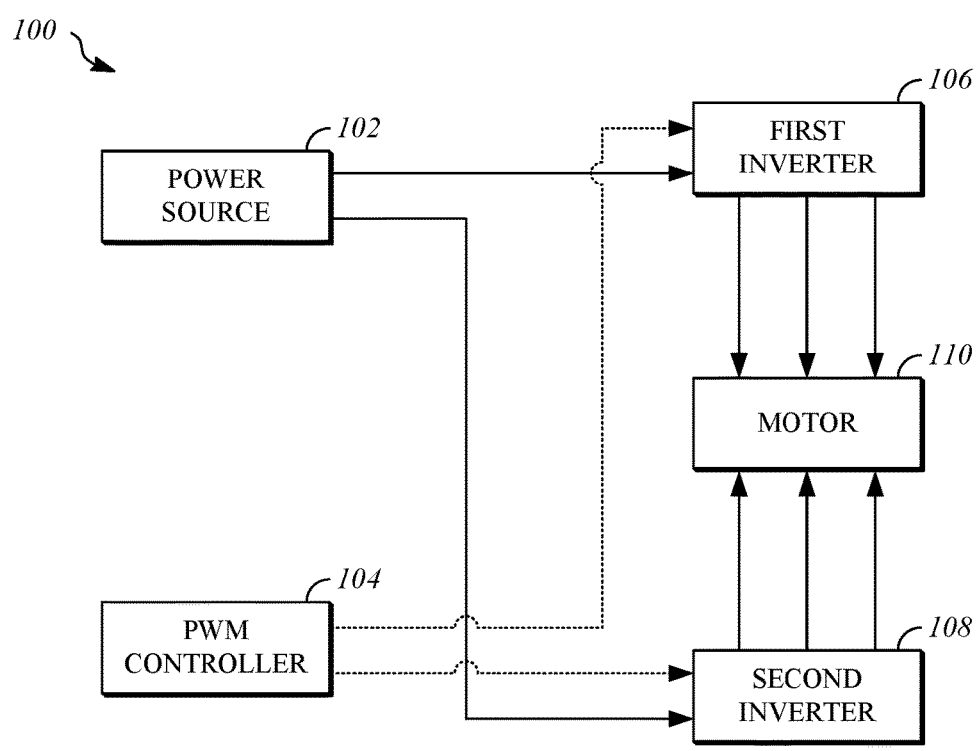
FIG. 1 is a block diagram showing a multiphase power system.

FIG. 1 is a block diagram showing a multiphase power system 100. The multiphase power system 100 may include a power source 102 such as a battery, a PWM controller 104, a first inverter 106, a second inverter 108, and an electric motor 110.

The power source 102 is operable to supply electrical power to the first inverter 106 and the second inverter 108. As one example, the power source 102 may be or include a battery that is operable to supply DC electrical power. As another example, the power source 102 may be or include a power generator system that is operable to supply DC electrical power.

The PWM controller 104 generates PWM control signals that regulate operation of the first inverter 106 and the second inverter 108. As will be discussed further herein, the PWM controller 104 operates in part based on feedback signals from the first inverter 106 and the second inverter 108.

The first inverter 106 and the second inverter 108 each receive electrical power from the power source 102. The first inverter 106 and the second inverter 108 also each receive respective PWM control signals from the PWM controller 104. The PWM control signals cause the first inverter 106 and the second inverter 108 to supply multiphase power to the electric motor 110. In the illustrated example, the first inverter 106 and the second inverter 108 each supply electrical power to the electric motor 110 for three-phases that are referred to as phase A, phase B, and phase C. The first inverter 106 has three power outputs, which are referred to herein as a first phase A power output $V\_a1$, a first phase B power output $V\_b1$, and a first phase C power output $V\_c1$. The second inverter 108 has three power outputs, which are referred to herein as a second phase A power output $V\_a2$, a second phase B power output $V\_b2$, and a second phase C power output $V\_c2$.

Figure 2:
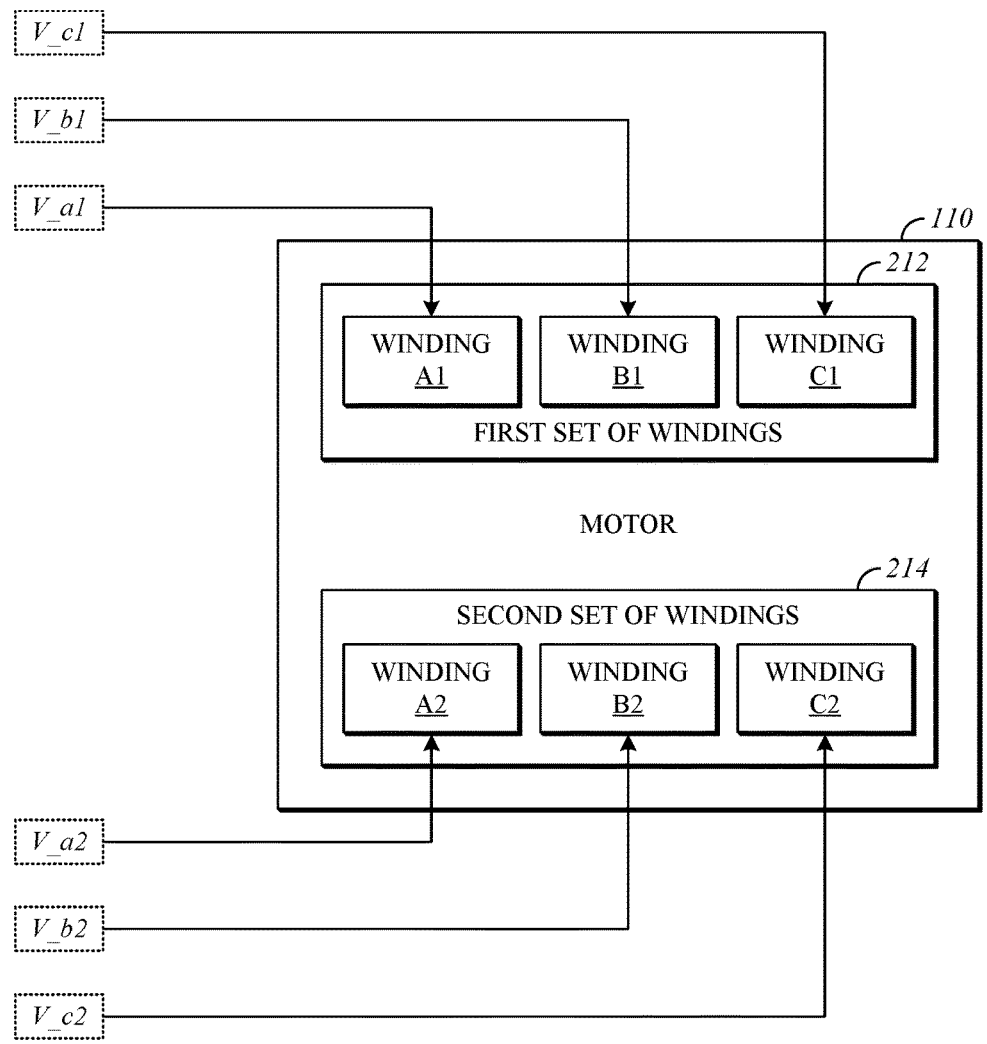
FIG. 2 is a block diagram showing an electric motor.

FIG. 2 is a block diagram showing the electric motor 110. The electric motor 110 may include dual windings for each phase, with each winding being fed by a respective inverter switch of the first inverter 106 and the second inverter 108, as will be explained further herein. As an example, the electric motor 110 may include a first set of windings 212 and a second set of windings 214.

The first set of windings 212 includes a first phase A winding A1, a first phase B winding B1, and a first phase C winding C1. The first phase A winding A1 is powered by the first phase A power output $V\_a1$ of the first inverter 106. The first phase B winding B1 is powered by the first phase B power output $V\_b1$ of the first inverter 106. The first phase C winding C1 is powered by the first phase C power output $V\_c1$ of the first inverter 106.

The second set of windings 214 includes a second phase A winding A2, a second phase B winding B2, and a second phase C winding C2. The second phase A winding A2 is powered by the second phase A power output $V\_a2$ of the second inverter 108. The second phase B winding B2 is powered by the second phase B power output $V\_b2$ of the second inverter 108. The second phase C winding C2 is powered by the second phase C power output $V\_c2$ of the second inverter 108.

Figure 3:
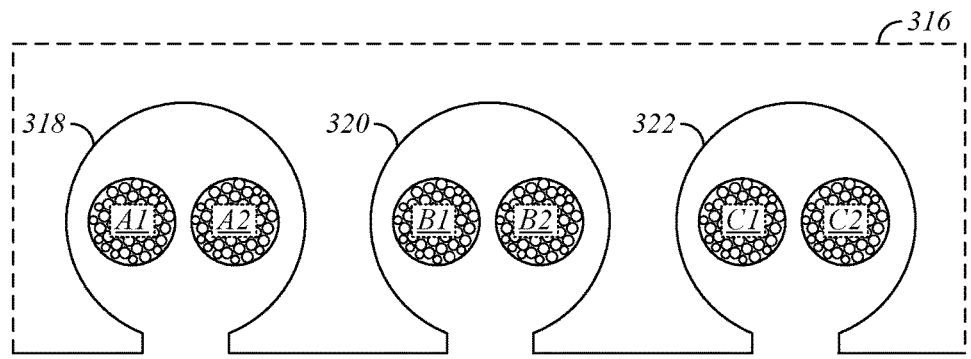
FIG. 3 is a diagram showing portion of a stator of the electric motor.

FIG. 3 is a diagram showing a portion of a stator 316 of the electric motor 110. The stator 316 includes a plurality of slots that are formed in an inner periphery of the stator 316 for holding the windings of the electric motor 110. The slots may extend in a longitudinal direction of the electric motor 110 and are arranged in a radial array around a central longitudinal axis of the electric motor 110. The plurality of slots includes a first slot 318 that corresponds to phase A, a second slot 320 that corresponds to phase B, and a third slot 322 that corresponds to phase C. This pattern of slots may repeat around the inner periphery of the stator 316. In some winding configurations, a slot may include windings from two or three-phases, depending on the winding configuration.

The windings from the first set of windings 212 are each paired with a respective winding from the second set of windings 214 to define paired windings that are energized by corresponding paired power outputs of the first inverter 106 and the second inverter 108. In some embodiments, the phase A windings are paired, the phase B windings are paired, and the phase C windings are paired. Thus, for example, the first phase A winding A1 and the second phase A winding A2 are paired as a first parallel winding pair and are disposed in the first slot 318, the first phase B winding B1 and the second phase B winding B2 are paired as a second parallel winding pair and are disposed in the second slot 320, and the first phase C winding and the second phase C winding are paired as a third parallel winding pair and are disposed in the third slot 322.

Figure 4:
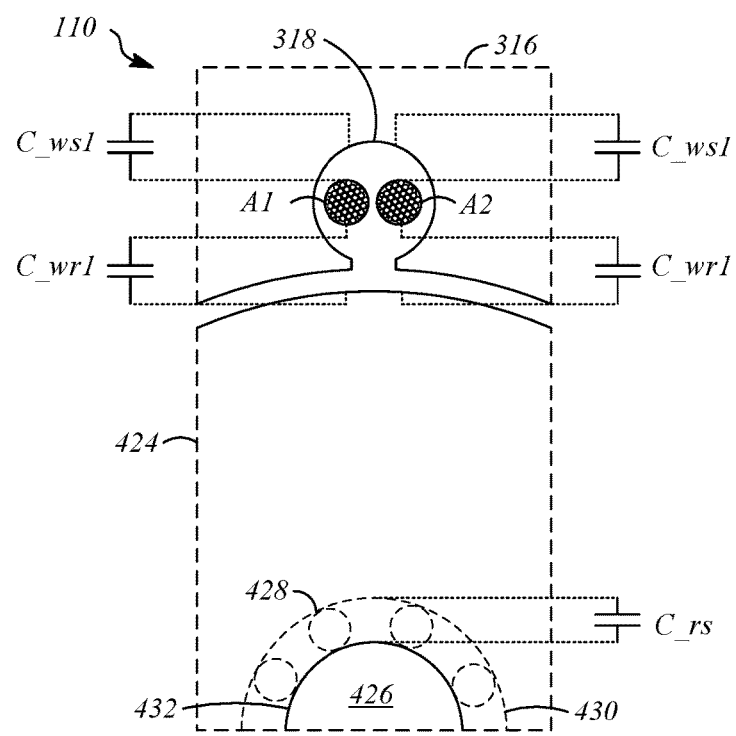
FIG. 4 is an illustration showing capacitances generated in a portion of the electric motor.

FIG. 4 is an illustration showing motor capacitances generated in a portion of the electric motor 110 that includes the first slot 318, the first phase A winding A1, and the second phase A winding A2. The electric motor includes the stator 316, a rotor 424, a shaft 426 that is connected to the rotor 424, and bearings 428 that are engaged with the shaft 426 to support the rotor 424 with respect to a frame (not shown) of the electric motor 110. The bearings 428 are engaged with an inner race 430 that is formed on or connected to the shaft 426 and an outer race 432 that is formed on or connected to the frame.

During switching of the inverter power feeds, there may be parasitic capacitive charges at various locations in the electric motor 110. As examples there may be capacitances between the phase windings and the stator 316, between the phase windings and the rotor 424, and across the bearings 428. Depending upon design details of the electric motor 110 these capacitances may exhibit separately for each of the windings in a pair of parallel windings. In the embodiment shown in FIG. 4, capacitances are shown with reference to the first phase A winding A1 and the second phase A winding A2 located in the first slot 318, as representative of capacitances for all of the phase windings. A first winding-stator capacitance $C\_ws1$ is present between the first phase A winding A1 and the stator 316. A second winding-stator capacitance $C\_ws2$ is present between the second phase A winding A2 and the stator 316. A first winding-rotor capacitance C_wr1 is present between the first phase A winding A1 and the rotor 424. A second winding-rotor capacitance C_wr2 is present between the second phase A winding A2 and the rotor 424. A rotor-stator capacitance C_rs is present between the rotor 424 and the stator 316 across the bearings 428, since the stator 316 is grounded to the frame of the electric motor 110.

Figure 5:
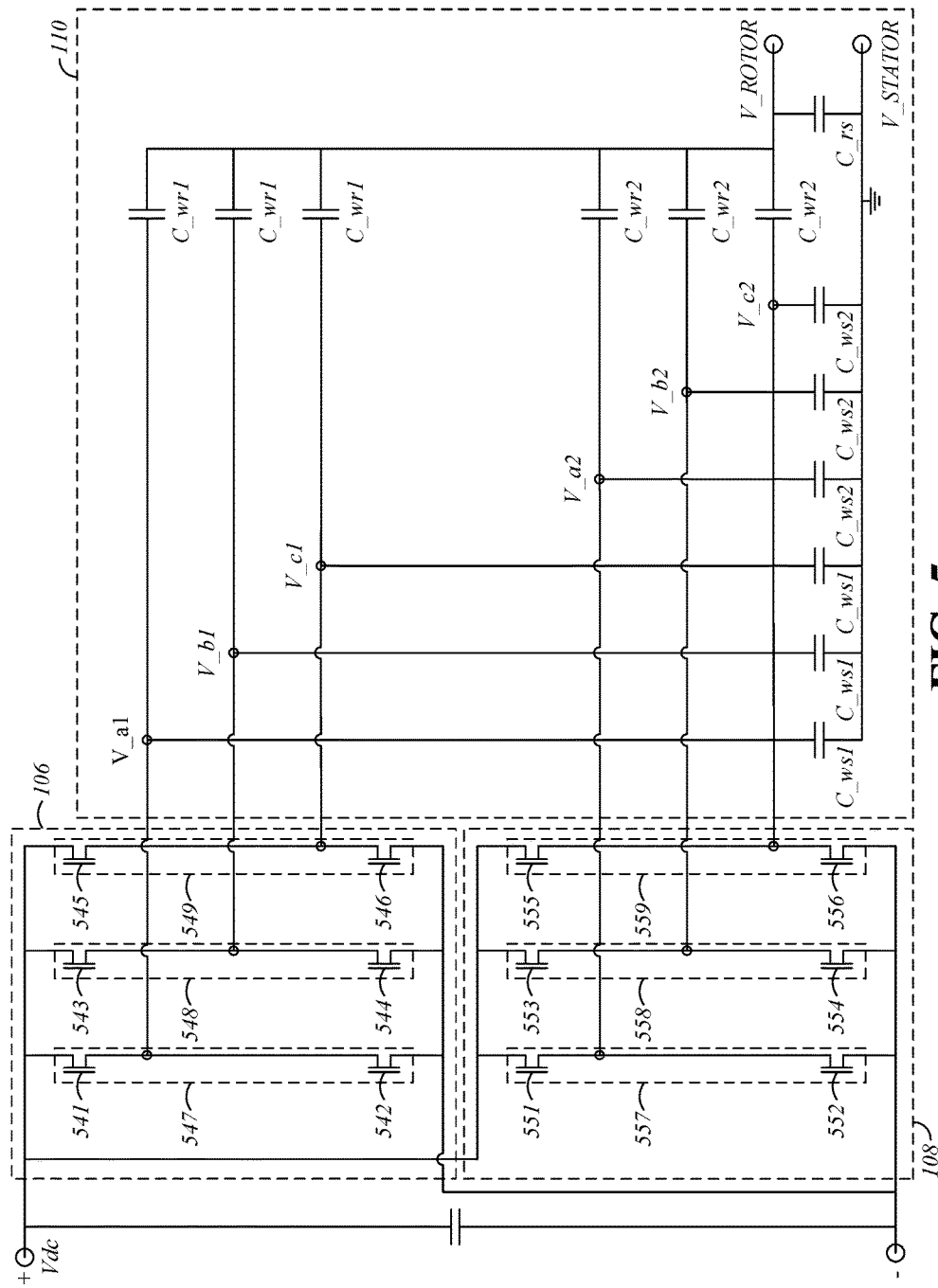
FIG. 5 is a circuit diagram showing a first inverter, a second inverter, and the electric motor, including motor capacitances.

FIG. 5 is a circuit diagram showing the first inverter 106, the second inverter 108, and the electric motor 110, including motor capacitances. The first inverter 106 and the second inverter 108 may each include a plurality of switches that are controlled to turn on and turn off to drive the phase windings of the electric motor 110. The switches may be transistors, such as insulated-gate bipolar transistors (IGBT), metal-oxide-semiconductor field effect (MOSFET) transistors, complementary metal-oxide-semiconductor (CMOS) transistors, junction gate field-effect transistors (JFET), bipolar junction transistors (BJT), or other types of transistors.

The plurality of switches of the first inverter 106 may include first upper and lower phase A switches 541, 542, first upper and lower phase B switches 543, 544, and first upper and lower phase C switches 545, 546. The first upper and lower phase A switches 541, 542 define a first switch pair 547 that supplies the first phase A power output V_a1, and is connected to the first phase A winding A1 of the first set of windings 212 to cause energization and deenergization of the first phase A winding A1 in response to turn on and turn off of the first switch pair 547. The first switch pair 547 is on (i.e. energizes the first phase A winding A1) when upper phase A switch 541 is turned on and the lower phase A switch 542 is turned off. The first switch pair 547 is off (i.e. does not energize the first phase A winding A1) when upper phase A switch 541 is turned off and the lower phase A switch 542 is turned on. The first upper and lower phase B switches 543, 544 define a second switch pair 548 that supplies the first phase B power output V_b1, and is connected to the first phase B winding B1 of the first set of windings 212 to cause energization and deenergization of the first phase B winding B1 in response to turn on and turn off of the second switch pair 548. The second switch pair 548 is on (i.e. energizes the first phase B winding B1) when upper phase B switch 543 is turned on and the lower phase B switch 544 is turned off. The second switch pair 548 is off (i.e. does not energize the first phase B winding B1) when upper phase B switch 543 is turned off and the lower phase B switch 544 is turned on. The first upper and lower phase C switches 545, 546 define a third switch pair 549 that supplies the first phase C power output V_c1, and is connected to the first phase C winding C1 of the first set of windings 212 to cause energization and deenergization of the first phase C winding C1 in response to turn on and turn off of the third switch pair 549. The third switch pair 549 is on (i.e. energizes the first phase C winding C1) when the upper phase C switch 545 is turned on and the lower phase C switch 546 is turned off. The third switch pair 549 is off (i.e. does not energize the first phase C winding C1) when upper phase C switch 545 is turned off and the lower phase C switch 546 is turned on.

The plurality of switches of the second inverter 108 may include second upper and lower phase A switches 551, 552, second upper and lower phase B switches 553, 554, and second upper and lower phase C switches 555, 556. The second upper and lower phase A switches 551, 552 define a fourth switch pair 557 that supplies the second phase A power output V_a2, and is connected to the second phase A winding A2 of the second set of windings 214 to cause energization and deenergization of the second phase A winding A2 in response to turn on and turn off of the fourth switch pair 557. The fourth switch pair 557 is on (i.e. energizes the second phase A winding A2) when upper phase A switch 551 is turned on and the lower phase A switch 552 is turned off. The fourth switch pair 557 is off (i.e. does not energize the second phase A winding A2) when upper phase A switch 551 is turned off and the lower phase A switch 552 is turned on. The second upper and lower phase B switches 553, 554 define a fifth switch pair 558 that supplies the second phase B power output V_b2, and is connected to the second phase B winding B2 of the second set of windings 214 to cause energization and deenergization of the second phase B winding B2 in response to turn on and turn off of the fifth switch pair 558. The fifth switch pair 558 is on (i.e. energizes the second phase B winding B2) when the upper phase B switch 553 is turned on and the lower phase B switch 553 is turned off. The fifth switch pair 558 is off (i.e. does not energize the second phase B winding B2) when upper phase B switch 553 is turned off and the lower phase B switch 554 is turned on. The second upper and lower phase C switches 555, 556 define a sixth switch pair 559 that supplies the second phase C power output V_c2, and is connected to the second phase C winding C2 of the second set of windings 214 to cause energization and deenergization of the second phase C winding C2 in response to turn on and turn off of the sixth switch pair 559. The sixth switch pair 559 is on (i.e. energizes the second phase C winding C2) when the upper phase C switch 555 is turned on and the lower phase C switch 556 is turned off. The sixth switch pair 559 is off (i.e. does not energize the second phase C winding C2) when upper phase C switch 555 is turned off and the lower phase C switch 556 is turned on.

For each phase of the first set of windings 212, the first winding-stator capacitances C_ws1 are generated between the windings and the stator 316, and the first winding-rotor capacitances C_wr1 are generated between the windings and the rotor 424. For each phase of the second set of windings 214, the second winding-stator capacitances C_ws2 are generated between the windings and the stator 316, and the second winding-rotor capacitances C_wr2 are generated between the windings and the rotor 424. The rotor-stator capacitance C_rs is also generated between the rotor and the stator across the bearings 428, as shown in FIG. 4.

Figure 6:
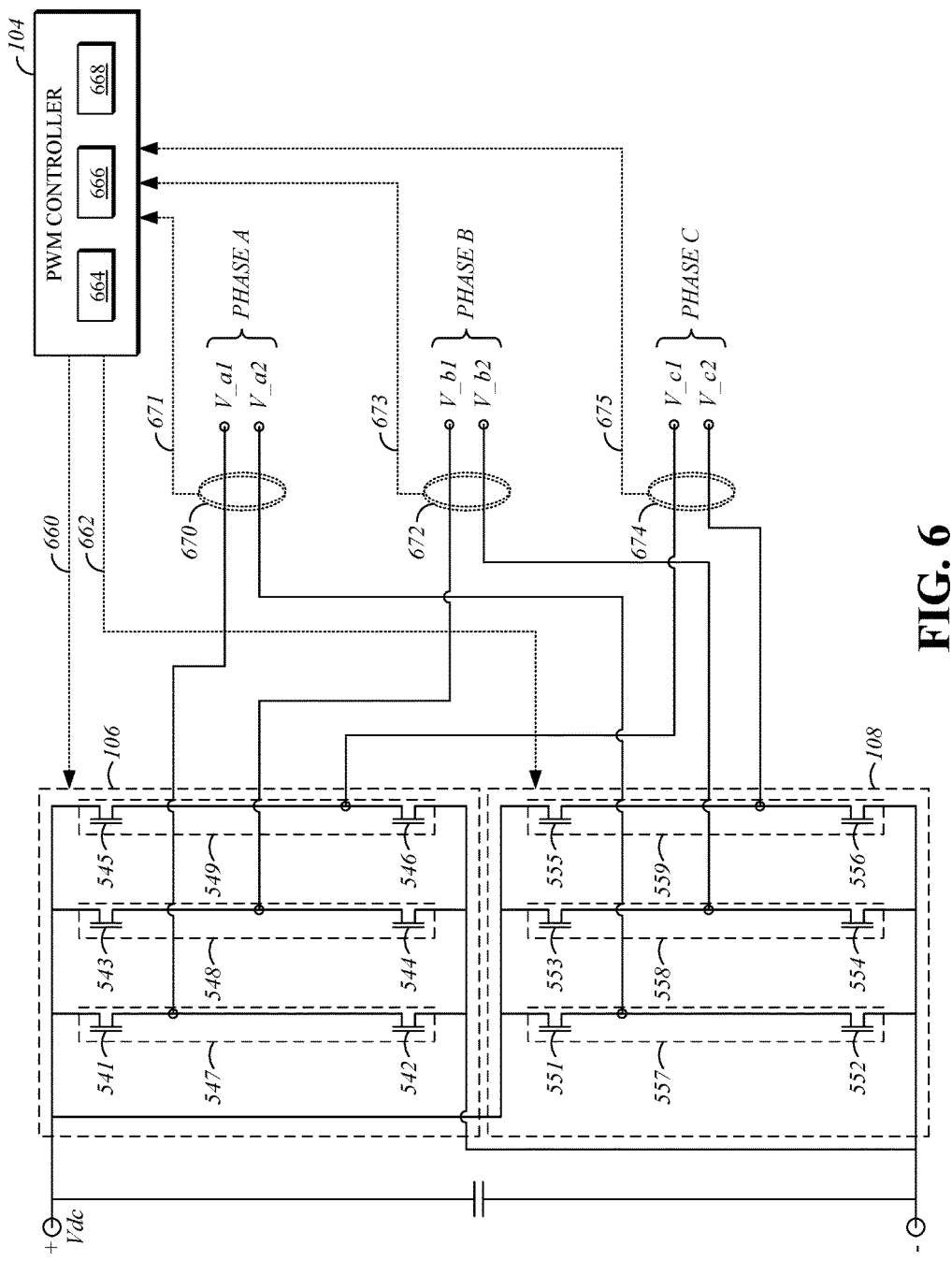
FIG. 6 circuit diagram showing the first inverter, the second inverter, and a PWM controller.

FIG. 6 circuit diagram showing the first inverter 106, the second inverter 108, and the PWM controller 104. The PWM controller 104 is operable to control turn on and turn off of the switches of the first inverter 106 and the second inverter 108 by outputting PWM control signals in order to cause operation of the electric motor 110. As an example, the PWM controller 104 may generate a first group of control signals 660 for the first inverter 106, and the PWM controller 104 may generate a second group of control signals 662 for the second inverter 108. The first group of control signals 660 may include distinct control signals that correspond to the first upper and lower phase A switches 541, 542 of the first switch pair 547, the first upper and lower phase B switches 543, 544 of the second switch pair 548, and the first upper and lower phase C switches 545, 546 of the third switch pair 549. The second group of control signals 662 may include distinct control signals that correspond to the second upper and lower phase A switches 551, 552 of the fourth switch pair 557, the second upper and lower phase B switches 553, 554 of the fifth switch pair 558, and the second upper and lower phase C switches 555, 556 of the sixth switch pair 559.

The PWM controller 104 may include, for example a processor 664, a pulse counter 666, and a clock 668. The processor 664 is operable to exercise control over generation of the PWM control signals, and may be implemented as a central processing unit (CPU), microcontroller, field programmable gate array (FPGA), or any other suitable processing device. As an example, the pulse counter 666 may be utilized to exercise time-proportioning control, by incrementing periodically during a PWM cycle, with each output of the PWM controller 104 switching between low and high states in when the value of the pulse counter 666 is greater than a reference value. In some embodiments, outputs for individual switches of the first inverter 106 and the second inverter 108 may be tracked by separate pulse counters.

The PWM controller 104 is part of an inverter control circuit that also includes one or more current sensors. The current sensors are operable to sense the current of the power outputs for each of the phases of the first inverter 106 and the second inverter 108 to allow the PWM controller 104 to regulate generation of the PWM control signals, such as the first group of control signals 660 and the second group of control signals 662.

In some embodiments, the inverter control circuit includes a phase A current sensor 670, a phase B current sensor 672, and a phase C current sensor 674 that are each operable to sense current for the phase A, B, or C outputs of both the first inverter 106 and the second inverter 108. The outputs of the phase A current sensor 670, a phase B current sensor 672, and a phase C current sensor 674 are a phase A current signal 671, a phase B current signal 673, and a phase C current signal 675 are utilized by the PWM controller 104 for regulating generation of the first group of control signals 660 and the second group of control signals 662.

The phase A current sensor 670 is coupled to a paired phase A output that includes the first phase A power output V_a1 of the first inverter 106 and the second phase A power output V_a2 of the second inverter 108. The phase A current sensor 670 outputs the phase A current signal 671 to the PWM controller 104. The phase B current sensor 672 is coupled to a paired phase A output that includes the first phase B power output V_b1 of the first inverter 106 and the second phase B power output V_b2 of the second inverter 108. The phase B current sensor 672 outputs the phase B current signal 673 to the PWM controller 104. The phase C current sensor 674 is coupled to a paired phase C output that includes the first phase C power output V_c1 of the first inverter 106 and the second phase C power output V_c2 of the second inverter 108. The phase C current sensor 674 outputs the phase C current signal 675 to the PWM controller 104.

Each of the phase A current sensor 670, the phase B current sensor 672, and the phase C current sensor 674 may include, for example, a current transformer that senses current at a respective inverter output pair. The current transformers may each be inductively coupled to the conductors of the respective paired output.

Based on the current signals received from the phase A current sensor 670, the phase B current sensor 672, and the phase C current sensor 674, the PWM controller 104 outputs the first group of control signals 660 and the second group of control signals 662 to cause the switches of the first inverter 106 and the second inverter 108 to change state between an on state in which the switches supply power to the respective phase windings of the electric motor 110 and an off state in which the switches do not supply power to the respective phase windings of the electric motor 110.

Because the PWM controller 104 has knowledge of the switch states for the switches of the first inverter 106 and the second inverter 108, the PWM controller 104 is able to independently measure currents for the outputs of each of the paired phase A output, the paired phase B output, and the paired phase C output. As an example, the switching state for the first phase A winding A1 and the second phase A winding A2 is utilized by the PWM controller to measure current for the first phase A power output V_a1 and to measure current for the second phase A power output V_a2 using the phase A current sensor 670. At a first time point, the first phase A power output V_a1 is on and the second phase A power output V_a2 is off. The PWM controller 104 receives the phase A current signal 671 and determines that this signal describes current for the first phase A power output V_a1 based on the switch state. At a second time point, the first phase A power output V_a1 is off and the second phase A power output V_a2 is on. The PWM controller 104 receives the phase A current signal 671 and determines that this signal describes current for the second phase A power output V_a2 based on the switch state. The same determinations are made for the phase B current signal 673 and the phase C current signal 675 based on the corresponding switch states for phase B and phase C.

State switching of the first inverter 106 and the second inverter 108 by the PWM controller 104 causes the switches to provide pulse width modulated currents. For each of the first inverter 106 and the second inverter 108, phase A, phase B, and phase C are controlled such that the output currents are equally out of phase with respect to one another. For example, phase A, B, C output currents for each of the first inverter 106 and the second inverter 108 may be separated by a 120 degree phase difference at the PWM frequency. In some embodiments, the PWM controller 104 may generate the first group of control signals 660 and the second group of control signals 662 to maintain an equal duty cycle for the output currents of each phase A, B, C, in response to the current signals. For example, the first phase A power output v_a1 of the first inverter 106 may have an equal duty cycle with respect to second the phase A power output v_a2 of the second inverter 108. As used herein, "equally out of phase" may include variances within a control tolerance, such as plus or minus 2.0 percent. As used herein, "equal duty cycle" may include variances within a control tolerance, such as plus or minus 2.0 percent.

In some embodiments, the PWM controller 104 may generate the first group of control signals 660 and the second group of control signals 662 such that the outputs of the outputs of the first inverter 106 and the outputs of the second inverter 108 are about 180 degrees out of phase with one another at the PWM frequency. As used herein, "about 180 degrees out of phase" may include variances within a control tolerance, such as plus or minus 2.0 percent. As a result, the outputs of each paired output are about 180 degrees out of phase with respect to each other. Thus, the first phase A power output V_a1 may be about 180 degrees out of phase from the second phase A power output V_a2, the first phase B power output V_b1 may be about 180 degrees out of phase from the second phase B power output V_b2, and the first phase C power output V_c1 may be about 180 degrees out of phase from the second phase C power output V_c2, all at the PWM frequency. Since the two inverters are operating with the same duty cycle, the first and second inverters will have a fundamental frequency current that is relatively equivalent (e.g., a phase offset of less than 10 percent and a magnitude different of less than 5 percent), since the fundamental frequency of an output current is in similar between the two phases of the paired outputs when providing power to an inductive load such as an electric motor. In some embodiments, the PWM frequency may be from 3 kHz to 300 kHz, and the fundamental frequency may be from 0 Hz to 2 kHz.

By maintaining output PWM voltage of for the outputs from each paired output for phase A, B, and C out of phase with respect each other, for example, by about 180 degrees, the rotor 424 of the electric motor 110 is not exposed to a high voltage condition by avoiding the peak supply voltage that may be caused, for example, by an all-on switch state in systems where an electric motor with a single set of windings is controlled by a single inverter.

Figure 7:
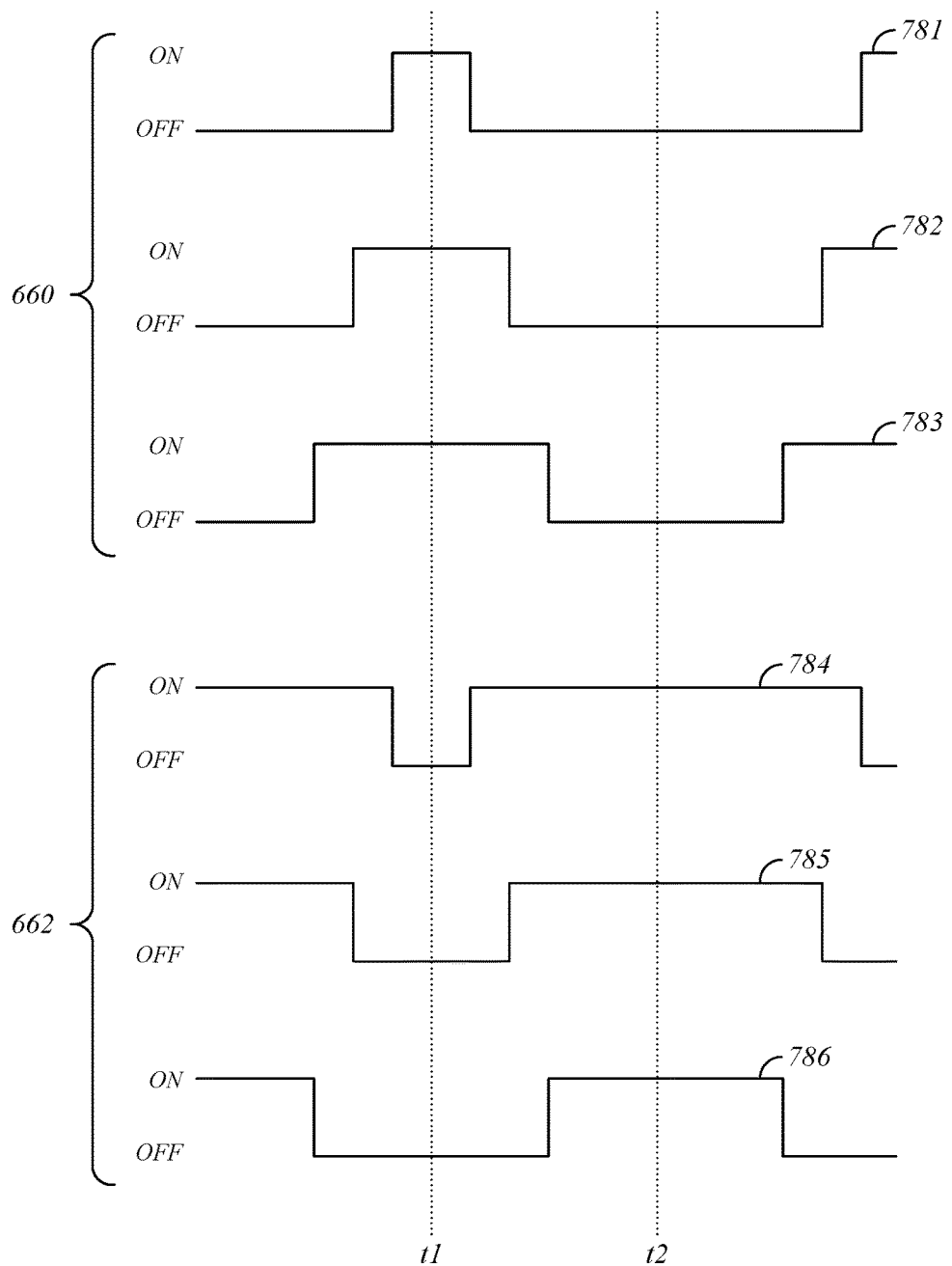
FIG. 7 is an illustration showing PWM control signals.

FIG. 7 is a diagram of an example of PWM control signals that may be generated by the PWM controller 104. The first group of control signals 660 includes a first phase A control signal 781, a first phase B control signal 782, and a first phase C control signal 783, which control operation of the first inverter 106. The first phase A control signal 781 controls the first upper and lower phase A switches 541, 542, the first phase B control signal 782 controls the first upper and lower phase B switches 543, 544, and the first phase C control signal 783 controls the first upper and lower phase C switches 545, 546. The second group of control signals 662 includes a second phase A control signal 784, a second phase B control signal 785, and a second phase C control signal 786, which control operation of the second inverter 108. The second phase A control signal 784 controls the second upper and lower phase A switches 551, 552, the second phase B control signal 785 controls the second upper and lower phase B switches 553, 554, and the second phase C control signal 786 controls the second upper and lower phase C switches 555, 556.

The first phase A control signal 781 and the second phase A control signal 784 may be controlled by the PWM controller 104 to maintain equal duty cycle and to be about 180 degrees out of phase. The first phase B control signal 782 and the second phase B control signal 785, and the first phase C control signal 783 and the second phase C control signal 786 are similarly controlled to maintain equal duty cycle and to be about 180 degrees out of phase. As a result, at a first time point t1, the first phase A control signal 781, the first phase B control signal 782, and the first phase C control signal 783 are in their on states, while the second phase A control signal 784, the second phase B control signal 785, and the second phase C control signal 786 are in their off states. At a second time point t2, the first phase A control signal 781, the first phase B control signal 782, and the first phase C control signal 783 are in their off states, while the second phase A control signal 784, the second phase B control signal 785, and the second phase C control signal 786 are in their on states.

Figure 8:
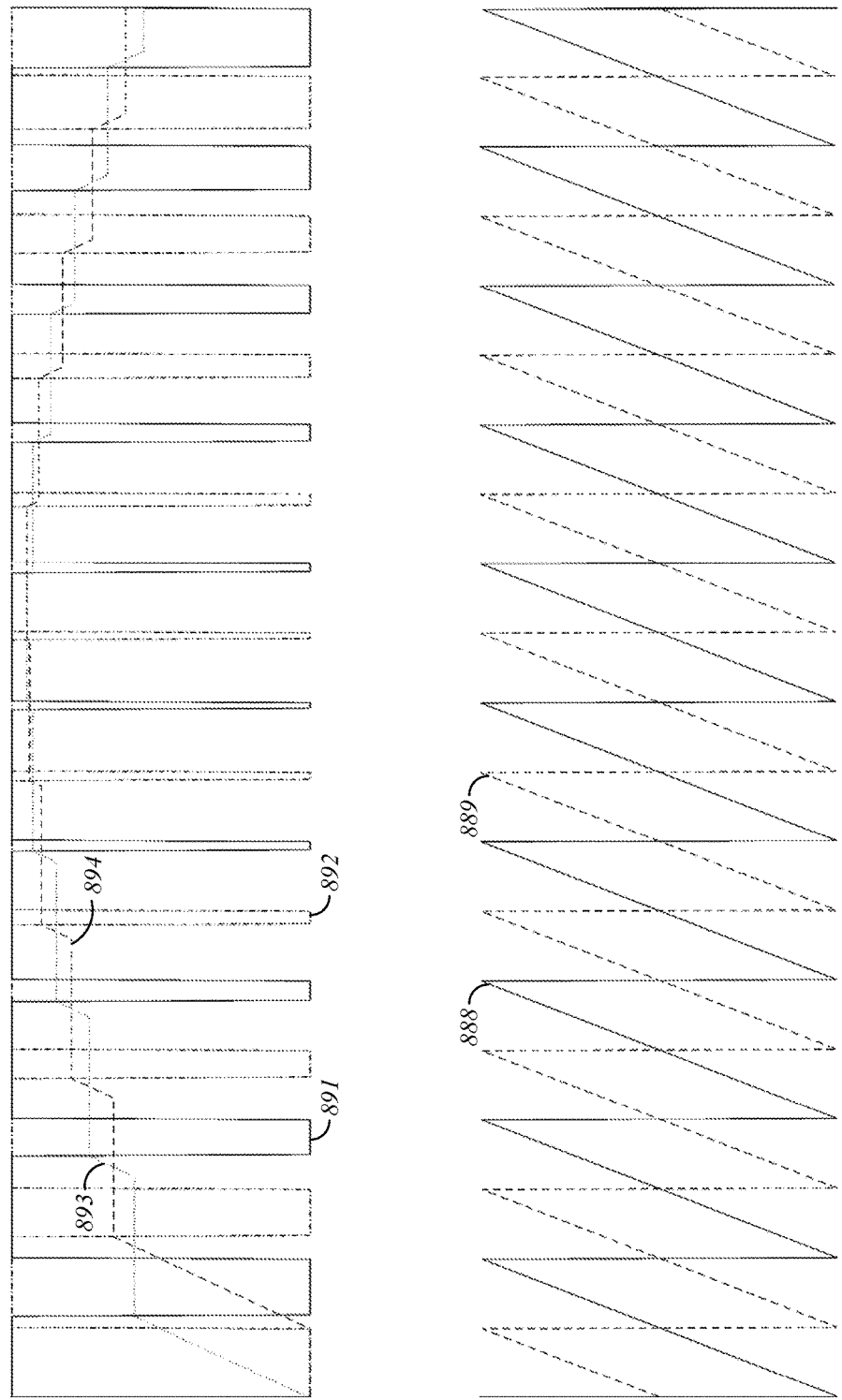
FIG. 8 is an illustration showing PWM control signals.

FIG. 8 is a diagram of an example of PWM control signals that may be generated by the PWM controller 104 as one of the control signals from the first group of control signals 660 and one of the control signals from the second group of control signals 662. In some embodiments, the PWM controller 104 may generate a first sawtooth clock signal 888 for a first inverter switch of a paired output and a second sawtooth clock signal 889 for a second inverter switch of the paired output based on a clock signal from the clock 668. The PWM controller 104 compares the first sawtooth clock signal 888 and the second sawtooth clock signal 889 to a set point value (which may be shared or similar for both inverter phases), and sets a first PWM control signal 891 and a second PWM control signal 892 to the on state when the respective one of the first sawtooth clock signal 888 or the second sawtooth clock signal 889 is above the set point value, and sets the first PWM control signal 891 or the second PWM control signal 892 to the off state when the respective one of the first sawtooth clock signal 888 or the second sawtooth clock signal 889 is below the set point value. Because the first sawtooth clock signal 888 and the second sawtooth clock signal 889 are interleaved (e. g., offset by about 180 degrees), and as a result the first PWM control signal 891 and the second PWM control signal 892 are interleaved, as seen in FIG. 8. The first PWM control signal 891 results in a first fundamental frequency 893 for the first inventor 106 and a second fundamental frequency for the second inverter 108. The first fundamental frequency 893 and the second fundamental frequency 894 are relatively equivalent (e.g., a phase offset of less than 10 percent and a magnitude different of less than 5 percent).

Figure 9:
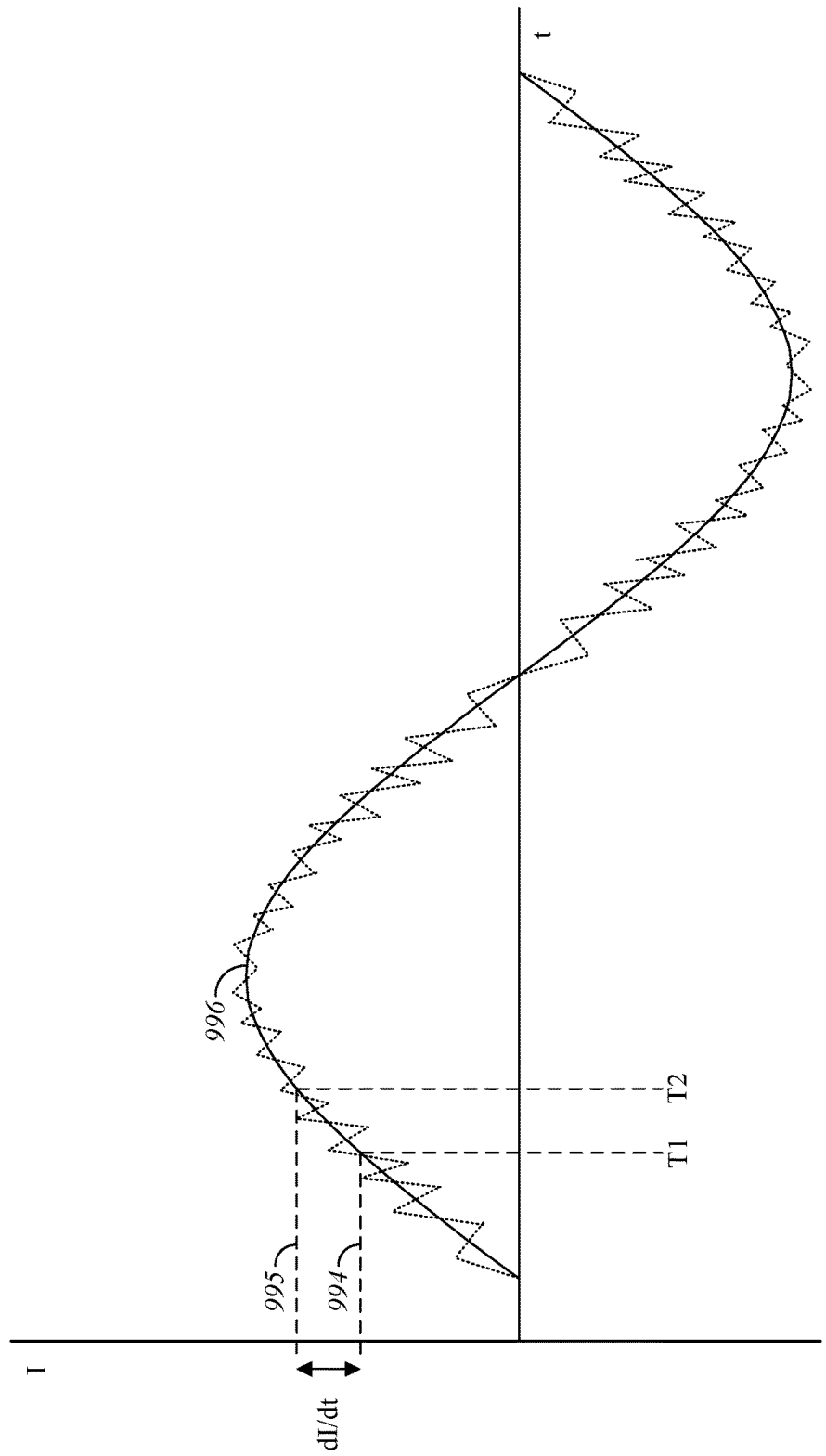
FIG. 9 is an illustration showing current differential measurement.

FIG. 9 is an illustration showing current differential measurement. The PWM controller 104 may generate the control signals from the first group of control signals 660 and the second group of control signal 662 based on differential current measured at two or more time points. For example, the PWM controller 104 may measure a first output current 994 based on the phase A current signal 671, the phase B current signal 673, and the phase C current signal 675 a first time point t1 and a second output current 995 at a second time point t2 to derive a current differential dI/dt. Upon detection of a current differential deviating from an expected differential current corresponding to the fundamental current 996 (i.e., the ideal current) for power supply to the electric motor 110 by more than a threshold value, the PWM controller 104 may adjust the phase control of the first and second groups of control signals 660, 662. The fundamental current 996 may be represented as a sinusoidal analog signal as shown in FIG. 8. In some embodiments, the PWM controller 104 may determine current sharing by the first inverter 106 and the second inverter 108 based on the measured differential current and fundamental current. For example, a deviation by more than a threshold value of measured current differential with respect to expected current differential may be an indication that the duty cycle or 180 degree phase difference between the paired outputs need to be realigned, and timing of one or more switch operations may be adjusted appropriately by the PWM controller 104 modifying the first and second groups of control signals 660, 662.

Figure 10:
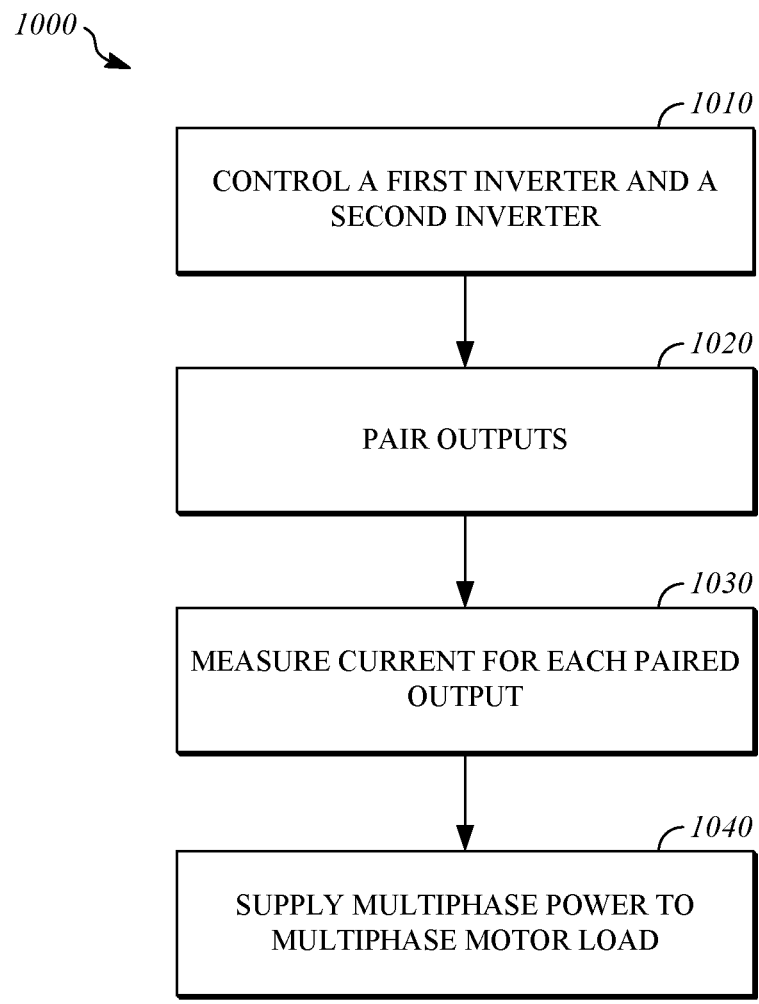
FIG. 10 is a flowchart showing a process for operating a multiphase power system.

FIG. 10 is a flowchart that shows a process 1000 for operating a multiphase power system. The process 1000 may be implemented, for example, using the multiphase power system 100.

Operation 1010 includes controlling a first inverter and a second inverter. The first inverter may have a first plurality of switches and the second inverter may have a second plurality of switches, as described with respect to the first inverter 106 and the second inverter 108. The first plurality of switches and the second plurality of switches may be operated according to a pulse width modulation sequence to produce a plurality of outputs.

In some embodiments, controlling the first inverter and the second inverter includes causing operation of switches for each paired output to be about 180 degrees out of phase and with equal duty cycle.

In some embodiments, controlling the first inverter and the second inverter may be performed by measuring differential current for at least one paired output. In some embodiments, controlling the first inverter and the second inverter includes causing generating a respective control signal based on the differential current, and controlling operation of each of the first plurality of switches and each of the second plurality of switches in response to the respective control signal. In some embodiments, on a condition that the differential current measured for at least one paired output deviates from an expected differential current, a control signal is generated that triggers an adjustment to pulse width modulation for phase realignment of the switches for at least one of the paired outputs from the plurality of paired outputs.

In some embodiments, controlling the first inverter and the second inverter includes controlling the pulse width modulation sequence such that output currents of the first plurality of switches are equally out of phase with respect to one another, and output currents of the second plurality of switches are equally out of phase with respect to one another. In some embodiments, controlling the pulse width modulation sequence comprises interleaving a first pulse width modulation counter of the first inverter with a second pulse width modulation counter of the second inverter by about 180 degrees.

In some embodiments, controlling the first inverter and the second inverter includes determining a differential current for each paired output based on a time difference between two of a plurality of current measurements. In some embodiments, controlling the first inverter and the second inverter further includes generating a respective control signal based on the differential current, and controlling operation of each of the first plurality of switches and each of the second plurality of switches in response to the respective control signal.

Operation 1020 includes pairing the output of each switch of the first inverter with output of a respective switch of the second inverter to produce a plurality of paired outputs. Each of the paired outputs is associated with one phase, such as phase A, phase B, or phase C, to supply multiphase power, such as three-phase power.

Operation 1030 includes measuring current for each paired output.

In some embodiments, measuring current for each paired output is performed using a single current sensor at each paired output. This may be done by determining first current values for each paired output based on switch state for first inverter and by determining first current values for each paired output based on switch state for first inverter. Determining the first and second current values can be performed by measuring the first current value when the respective switch of the first inverter is on and the respective switch of the second inverter is off, and by measuring the second current value when the respective switch of the first inverter is off and the respective switch of the second inverter is on.

In some embodiments, measuring current for each paired output includes obtaining plurality of current measurements at the single current sensor, by measuring a first current output at a first time point and a second current output at a second time point corresponding to operations of a first switch. In some embodiments, measuring current for each paired output further includes determining a differential current based on a time difference between two measurements of the plurality of current measurements, and the differential current may be used to control the first inverter and the second inverter by generating a respective control signal based on the differential current and controlling operation of each of the first plurality of switches and each of the second plurality of switches in response to the respective control signal. In some embodiments, measuring current for each paired output includes determining a differential current based on a time difference between two measurements of the plurality of current measurements by measuring a first current output of a first switch from the first plurality of switches at a first time point and a second current output at a second time point, and comparing the differential current to an expected differential current. As an example, the expected differential current may be based on a fundamental current. In some embodiments, current sharing between the first inverter and the second inverter may be identified based on the fundamental current and the differential current.

Operation 1040 includes supplying multiphase power to a multiphase motor load, such as the electric motor 110. In some embodiments, each phase of the multiphase motor load is coupled to a respective paired output from the plurality of paired outputs. In some embodiments, each phase of the multiphase motor load includes a paired winding.

What is claimed is:

1. A method, comprising:
controlling a first inverter and a second inverter, the first inverter having a first plurality of switch pairs and the second inverter having a second plurality of switch pairs, wherein the first plurality of switch pairs and the second plurality of switch pairs are operated in a pulse width modulation sequence to produce a plurality of outputs;
pairing output of each switch pair of the first inverter with output of a respective switch pair of the second inverter to produce a plurality of paired outputs that are each associated with one phase to supply multiphase power;
measuring current for the switch pairs of each paired output using a current sensor shared by the switch pairs of the respective paired output; and
controlling operation of switches for each paired output to be about 180 degrees out of phase and with equal duty cycle based on the measured current for each paired output.

2. The method of claim 1, wherein measuring current comprises a plurality of current measurements at the single current sensor, the method further comprising:
measuring a first current output at a first time point and a second current output at a second time point corresponding to operations of a first switch pair.

3. The method of claim 1, wherein the plurality of paired outputs includes three paired outputs, the method further comprising:
supplying three-phase power to a three-phase motor load, wherein each phase is coupled to a respective paired output of the plurality of paired outputs.

4. A method, comprising:
controlling a first inverter and a second inverter, the first inverter having a first plurality of switch pairs and the second inverter having a second plurality of switch pairs, wherein the first plurality of switch pairs and the second plurality of switch pairs are operated in a pulse width modulation sequence to produce a plurality of outputs;
pairing output of each switch pair of the first inverter with output of a respective switch pair of the second inverter to produce a plurality of paired outputs that are each associated with one phase to supply multiphase power;
measuring current for the switch pairs each paired output using a current sensor shared by the switch pairs of the respective paired output, wherein measuring current comprises a plurality of current measurements at the current sensor shared by the switch pairs of the respective paired output;

determining a differential current based on a time difference between two measurements of the plurality of current measurements;
generating a respective control signal based on the differential current; and
controlling operation of each of the first plurality of switch pairs and each of the second plurality of switch pairs in response to the respective control signal.

5. A method, comprising:
controlling a first inverter and a second inverter, the first inverter having a first plurality of switch pairs and the second inverter having a second plurality of switch pairs, wherein the first plurality of switch pairs and the second plurality of switch pairs are operated in a pulse width modulation sequence to produce a plurality of outputs;
pairing output of each switch pair of the first inverter with output of a respective switch pair of the second inverter to produce a plurality of paired outputs that are each associated with one phase to supply multiphase power;
measuring current for the switch pairs of each paired output using a current sensor shared by the switch pairs of the respective paired output, wherein measuring current comprises a plurality of current measurements at the current sensor shared by the switch pairs of the respective paired output;
determining a differential current based on a time difference between two measurements of the plurality of current measurements;
controlling operation of switches for each paired output to be about 180 degrees out of phase and with equal duty cycle; and
on a condition that the differential current measured for at least one paired output deviates from an expected differential current, generating a control signal that triggers an adjustment to pulse width modulation for phase realignment of one or more switch pairs from the first plurality of switch pairs or the second plurality of switch pairs.

6. A method, comprising:
controlling a first inverter and a second inverter, the first inverter having a first plurality of switch pairs and the second inverter having a second plurality of switch pairs, wherein the first plurality of switch pairs and the second plurality of switch pairs are operated in a pulse width modulation sequence to produce a plurality of outputs;
pairing output of each switch pair of the first inverter with output of a respective switch pair of the second inverter to produce a plurality of paired outputs that are each associated with one phase to supply multiphase power;
measuring current for the switch pairs of each paired output using a current sensor shared by the switch pairs of the respective paired output, wherein measuring current comprises a plurality of current measurements at the current sensor shared by the switch pairs of the respective paired output;
determining a differential current based on a time difference between two measurements of the plurality of current measurements by measuring a first current output of a first switch pair from the first plurality of switch pairs at a first time point and a second current output at a second time point; and
comparing the differential current to an expected differential current.

7. The method of claim 6, further comprising:
identifying current sharing by the first inverter and the second inverter based on a fundamental current and the differential current.

8. A method, comprising:
controlling a first inverter and a second inverter according to a pulse width modulation sequence to produce a plurality of outputs, the first inverter having a first plurality of switch pairs and the second inverter having a second plurality of switch pairs;
pairing the plurality of outputs such that a plurality of paired outputs each include a first output corresponding to the first plurality of switch pairs and a second output corresponding to the second plurality of switch pairs, wherein each paired output is associated with one phase to supply multiphase power and the pulse width modulation sequence causes output currents at a pulse width modulation frequency for a group of switch pairs corresponding to of the plurality of paired outputs to be out of phase by about 180 degrees with respect to one another with equal duty cycle; and
supplying the multiphase power to a multiphase motor load, wherein each phase of the multiphase motor load is coupled to a respective paired output from the plurality of paired outputs.

9. The method of claim 8, wherein each phase of the multiphase motor load includes a paired winding.

10. The method of claim 8, further comprising:
controlling the pulse width modulation sequence such that output currents of the first plurality of switch pairs are equally out of phase with respect to one another and output currents of the second plurality of switch pairs are equally out of phase with respect to one another.

11. The method of claim 8, wherein controlling the pulse width modulation sequence comprises:
interleaving a first pulse width modulation counter of the first inverter with a second pulse width modulation counter of the second inverter by about 180 degrees.

12. The method of claim 8, further comprising:
determining a differential current for each paired output based on a time difference between two of a plurality of current measurements.

13. The method of claim 12, further comprising:
generating a respective control signal based on the differential current; and
controlling operation of each of the first plurality of switch pairs and each of the second plurality of switch pairs in response to the respective control signal.

14. An apparatus comprising:
a first inverter comprising a first plurality of switch pairs coupled to a DC input voltage;
a second inverter comprising a second plurality of switch pairs coupled to the DC input voltage;
a first paired output that includes a first switch output of the first plurality of switch pairs and a first switch output of the second plurality of switch pairs;
a second paired output that includes a second switch output of the first plurality of switch pairs and a second switch output of the second plurality of switch pairs;
a third paired output that includes a third switch output of the first plurality of switch pairs and a third switch output of the second plurality of switch pairs; and
a pulse width modulation controller for controlling the first plurality of switch pairs and the second plurality of switch pairs by pulse width modulation to generate a three-phase current supply from the first paired output, the second paired output and the third paired output, such that output currents at a pulse width modulation frequency for the switch pairs corresponding to the first paired output are out of phase by about 180 degrees with respect to one another with equal duty cycle.

15. The apparatus of claim 14, wherein the pulse width modulation controller controls the first plurality of switch pairs and the second plurality of switch pairs such that output currents of the switches of the first plurality of switch pairs are equally out of phase with respect to one another and output currents of the switches of the second plurality of switch pairs are equally out of phase with respect to one another.

16. The apparatus of claim 14, further comprising:
a first current sensor for measuring current of the first paired output, wherein the pulse width modulation controller obtains a plurality of current measurements from the first current sensor including a first current measurement at a first time point and a second current measurement at a second time point corresponding to the first paired output, and determines a differential current based on a time difference between two current measurements of the plurality of current measurements.

17. The apparatus of claim 16, wherein the pulse width modulation controller generates a first control signal based on the differential current and controls operation of switch pairs associated with the first switch output in response to the first control signal.

18. The apparatus of claim 16, wherein the pulse width modulation controller adjusts pulse width modulation for phase realignment of the switch pairs associated with the first switch output on a condition that a deviation of the differential current from an expected differential current is greater than a threshold value.

19. The apparatus of claim 14, wherein the first switch output is coupled to a first phase input of a three-phase motor, the second switch output is coupled to a second phase input of the three-phase motor, and the third switch output is coupled to a third phase input of the three-phase motor.

20. The apparatus of claim 14, wherein the pulse width modulation controller comprises:
a first pulse width modulation counter for counting duty cycle pulses of the first inverter; and
a second pulse width modulation counter for counting duty cycle pulses of the second inverter, wherein the pulse width modulation controller interleaves the first pulse width modulation counter with the second pulse width modulation counter by about 180 degrees.

* * * * *